Nov. 17, 1959 A. N. STANTON 2,913,632

MICRO-CIRCUITS, ELECTRIC DEVICES THEREFOR, AND METHODS FOR MAKING SAME

Filed Aug. 8, 1955

Austin N. Stanton

INVENTOR

BY Wm. T. Wofford

ATTORNEY 2,913,632
Patented Nov. 17, 1959

2,913,632

MICRO-CIRCUITS, ELECTRIC DEVICES THEREFOR, AND METHODS FOR MAKING SAME

Austin N. Stanton, Garland, Tex.

Application August 8, 1955, Serial No. 526,928

1 Claim. (Cl. 317—101)

My invention relates to micro-circuits and electric devices therefor, and more particularly to electric devices wherein circuit components and electron discharge devices are very small and wherein electric or electronic circuits are made up in unitary packages, each having a very small volume.

Continued size reduction and improved reliability have merited the constant attention of the electronics industry since its inception, and still do. Size reduction is always attended by weight reduction and usually reduced power consumption, with resulting savings in material and operating cost. Size reduction accomplished by miniaturization of more or less conventional type components has reached a point where little additional size decrease can be expected. Such miniaturization has practical limits dictated among other things by coarseness of human control, poor resolution of human eye, high cost of tedious assembly of small parts, and inability to control dimensions and monitor assembly operations effectively enough to assure reasonable production yields. In brief, the law of diminishing returns dictates consideration of radically different techniques to open the way to significant improvements in economy, size reduction, and reliability of low power electric and electronic devices.

It is accordingly an object of my invention to provide novel electric and electronic devices significantly smaller than conventional miniaturized devices for similar purposes.

Another object of my invention is to provide electric and electronic devices embodying significant improvements in reduced size and power consumption and increased reliability.

Another object of my invention is to provide electric and electronic devices having very small dimensions and yet susceptible to effective production control.

Another object of my invention is to provide practical electric and electronic devices utilizing components approaching microscopic dimensions.

Another object of my invention is to provide techniques whereby it is feasible to embody complex electronic circuits in self-contained sealed units having small dimensions.

The foregoing and other objects are effected by my invention as will be apparent from the following description taken in accordance with the accompanying drawing, forming a part of this application in which.

Electric and electronic devices in accordance with my invention embody a structure including a stack of thin dielectric sheets. The sheets are perforated at selected locations and the perforations extend through a selected number of layers. The extent and registration of the perforations may vary according to their use. A plurality of registered perforations may be utilized to form the envelope for an electron discharge device. Other perforations may be utilized as conduits for conducting paths connecting electric circuit components or electron discharge device elements of different stratums of the device. Substantially planar electron discharge device elements extend over the perforations which form electron discharge device envelopes at different stratums. The exterior surfaces of the stack are all sealed and the interior is evacuated. Terminals are brought out of the stack as necessary, as will be hereinafter more fully described. Thus, the completed devices take the form of three dimensional geometric figures, sealed and evacuated and containing electric circuit components connected to operate as complete circuits or systems, with appropriate input and output terminals.

Figure 1:
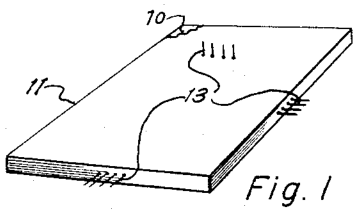
Figure 1 is a schematic perspective representation of an electric or electronic device in accordance with my invention.
Figure 2:
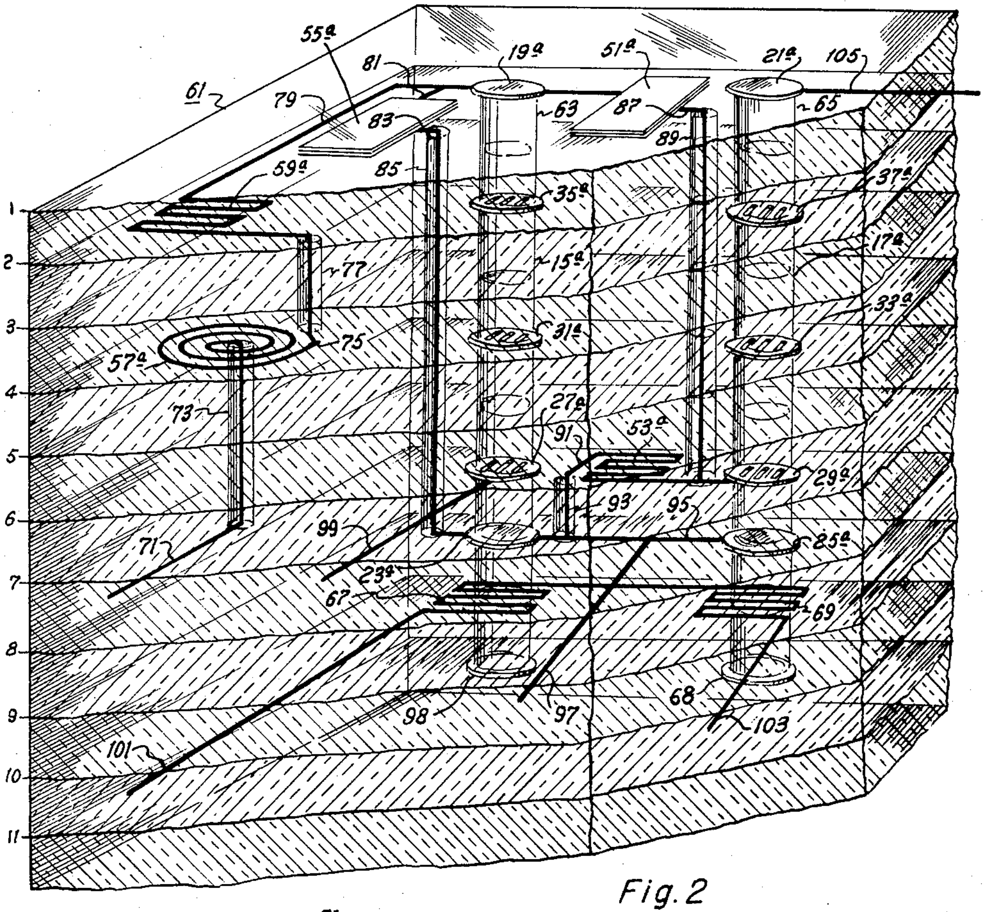
Figure 2 is an enlarged schematic perspective view, partially cut away, showing details of an electronic device in accordance with my invention.
Figure 3:
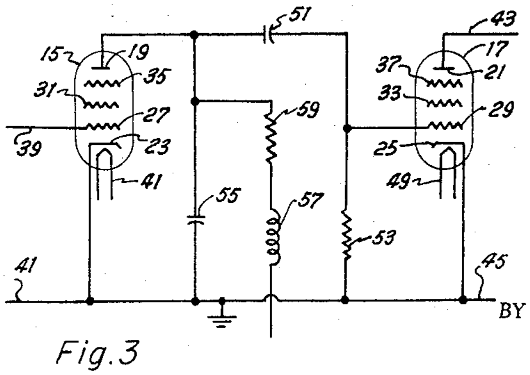
Figure 3 is a schematic circuit diagram showing a conventional electronic circuit having components corresponding to those shown by Figure 2.

Figure 1 is a schematic representation of a complete unit constructed in accordance with my invention having a body 11 in the form of a three dimensional geometric figure, with terminals 13 brought out to the exterior. Figure 2 is a schematic representation of what may be considered as a small section or segment taken from a corner portion 10 of a complete device and showing details of construction of parts of the device. The circuit shown in Figure 2 is that of a conventional two terminal coupling network of a type used in television video amplifier sections, chosen to illustrate treatment of typical circuit components in the application of my invention. The same circuit in its conventional schematic form is shown by Figure 3, wherein pentode amplifier tubes 15, 17 having anodes 19, 21, cathodes 23, 25, control electrodes 27, 29, screen grids 31, 33, and suppressor grids 35, 37, respectively, input leads 39, 41, output leads 43, 45 and filament leads 47, 49, respectively, are coupled by a network comprising a coupling capacitor 51 connected between the anode 19 of the first pentode 15 and the control electrode 29 of the second, a first resistor 53 connected between the control electrode 29 and cathode 25 of the second pentode 17, a shunting capacitor 55 connected between the anode and the cathode of the first pentode 15, and an inductance 57 connected serially with a second resistor 59 to the anode of the first pentode 15. Referring now in more detail to Figure 2, where circuit components, electron discharge device elements, and leads have the same reference numerals as corresponding parts of Figure 3 except with subscripts added, there is shown a stack of thin dielectric sheets 61. For clarity in description, the top surface of the top sheet will be called the first level or stratum, the surfaces between the top and adjacent sheet the second level or stratum, etc., the surfaces between the bottom and next to bottom sheets shown then being the eleventh level. Two sets of registered perforations 63, 65, each extending from the second to the eleventh level form envelopes for electron discharge devices **15*a*, 17*a* which are pentodes. All of the circuit components and electron discharge device elements are substantially planar configurations of conductive materials, which will be hereinafter more fully described. The filaments 67, 69 of the pentodes are at the tenth level, the cathodes 23*a*, 25*a* at the ninth level, the control grids 27*a*, 29*a* at the eighth, the screen grids 31*a*, 33*a* at the sixth, the suppressor grids 35*a*, 37*a* at the fourth, and the anodes 19*a*, 21*a* at the second level. Reflectors 68, 98 at the eleventh level aid in cathode heating. Tracing the circuit, a lead 71 at level seven goes up through perforations 73 and connects to one side of an inductance 57a at level four. The other side of the inductance is connected via a lead 75 that goes up through perforations 77 and connects to one side of a resistor 59a at level two. The other side of the resistor is connected via a lead 79 to the anode 19a of the first pentode, which is also connected via a lead 81 to one plate of the capacitor 55a. The other plate of the capacitor which is at level three, is connected via a lead 83 that goes down through perforations 85 to level nine and over to the first pentode cathode 23a. The first pentode anode 19a is also connected to one plate of a coupling capacitor 51a at level two. The other plate of the coupling capacitor at level three is connected via a lead 87 that goes down through perforations 89 to level eight and over to the second pentode control grid 29a, which is also connected to one side of a second resistor 53a at level eight the other side of which is connected via a lead 91 going down through perforations 93 to level nine where it joins a lead 95 connecting the cathodes of the pentodes. A lead 97 at level nine connects the cathodes to other circuits not shown. An input lead 99 at level eight connects to the control grid of the first pentode. Leads 101, 103 at level ten connect the pentode filaments in series and to the supply circuit, not shown. Output lead 105** at level two is connected from the second pentode anode to other circuits, not shown. Connections for the pentode screen and suppressor grids are not shown. The top dielectric sheet is not perforated, nor is the bottom sheet of the stack. The marginal edges of the sheets are sealed so the device will be vacuum tight.

Turning now to the manner and methods of construction, the sheets are first stacked and perforated. The perforations are preferably made by an electron beam or by photo etching. The dielectric sheets are preferably thin glass. Glass sheets as thin as .001 inch are now available and .001 cm. is possible. A concentrated beam of electrons is capable of destroying the chemical bonds in glass molecules, thereby making a hole of the diameter of the beam. This method will produce more regular holes than photo etching, which follows natural grain boundaries. The entire member of plates to be used may be perforated and the top and bottom surfaces later sealed, or all but top and bottom sheets may be perforated. Also, the sheets may be perforated in various combinations of stratums so that electron discharge envelopes and connection conduits are closed at various levels.

After perforating, the sheets are dis-assembled and a sheet of thin metal foil is attached to one side of each plate which is to have conducting elements. Portions of the metal are then etched or burned away by a controlled stream of electrons or ions. The remaining metal constitutes the conductors and circuit components. Instead of using sheets of metal foil, metal films may be evaporated on thin plastic sheets and the metallized side then brought into contact with the perforated glass surface and the plastic then dissolved, leaving the metal film on the glass sheet. Alternatively, microscopic metallic lines may be produced on glass surface by manipulation of a beam of ions impinging on the plate. The beam may be mechanically controlled while being watched through the image screen of an electron microscope. Or a circuit drawing may be scanned with a vidicon, translating the pickup into a modulated ion beam, swept in synchronism with the vidicon but on a very reduced scale. Another method is the reverse electron microscope technique, where a circuit drawing is converted into an electron image which would then, by means of electron and magnetic lenses, be reduced to the required size, and applied to the glass to induce the required action. Such image may be used to charge the glass surface so that metal ions would be attracted or repelled. It might be used to remove a part of a metal film in the shape of the image, or to cause chemical changes in a metal salt film, as in photo etching.

Figure 4:
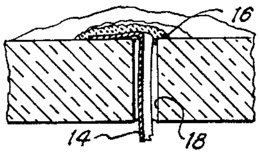
Figure 4 is a terminal detail.

It is possible to produce many types of circuit components using the techniques herein discussed. Resistors, except for size, will resemble those of conventional printed circuits, and may be made of the general type of materials. Transformers consist of flat spirals of conductive material usually with one layer each in primary and secondary, these being separated by one or more thicknesses of dielectric sheets. Capacitors consist of conductive layers separated either by a sheet of dielectric or by thinner dielectric coatings interposed between conductive layers. Rectifiers may be vacuum diodes, consisting of cathode and anode stretched across perforations at separated levels, or they may be solid state rectifiers consisting of deposited layers having composition similar to copper oxide, germanium, or silicon rectifiers. Amplifiers may be multi-element vacuum tubes extending through several deposited layers, or they may be transistors consisting of layers of deposited material. Grid elements of electron tubes would be formed by slitting foil or metal extending over a hole with a controlled electron beam. Theoretically beam size of less than 250 angstroms is possible. A grid having 100 wires and 100 spaces of equal width would have a total width of only $5\times10^{-6}$ cm. As a practical matter, a total width of .01 cm. for the grid, which would also be the tube diameter would provide 100 tubes per sq. cm. using a spacing of nine times the tube diameter, with a clear space at each level of 99 times the tube area adjacent each tube for associated circuitry. Even greater element density is possible. When the individual sheets have been prepared, they are stacked in proper order and the entire unit is evacuated and sealed. Terminals for the devices may be metallic conductors brought through holes in the outer glass sheath and terminated in the metallic buttons on the outside, or the conductors may be passed through the joints between the adjacent sheets at the edges of the devices. Figure 4 shows how a conductor 14 may be brought up through a hole 18 and folded over on the glass top surface and covered with a conductive button 16.

Although actual dimensions of sheets, components, perforations and elements will of course depend largely upon the degree to which the herein described techniques can be applied by the particular manufacturer and on the extent of current technology, it is obvious that the principles are applicable over a very wide range of sizes and dimensions. It is feasible that by application of the principles of my invention thousands of components and elements may be built within a very small volume. It is contemplated that all required elements for low power applications such as computers, and the RF and IF portions of radio, radar, and television receivers may be produced in accordance with the principles of my invention. Eventually, by application of these principles, cost factors may dictate replacement rather than repair of such a piece of equipment as a 10,000 element computer. A further possibility is the development of direct transparent viewing screens containing all components required to produce a television presentation and with element density sufficient to produce grainless images, the screens having large areas, but of thickness dictated only by requirements for mechanical strength. The power required for such devices is small indeed. It is within the realm of possibility that in some cases heat from outside the enclosure would produce sufficient current through use of built in thermocouples or piles.

The process involved in manufacture of the smaller sizes of devices comtemplated by my invention is preferably carried out within an evacuated enclosure, with materials being distilled and applied directly to the sheet surfaces, or in some cases to intermediate forming surfaces, with the etching process applied in situ, and assembly of the sheets and sealing of the device being completed before the vacuum is removed.

Electronic systems built in accordance with my invention open a number of interesting opportunities. The availability of thousands of tubes and other components makes it possible to parallel many circuits. This gives the effect of having many spares on hand always ready and connected to take over should one circuit go out. Again, availability of a large number of tubes permits contemplation of new computer philosophies, such as those which would utilize statistical information rather than single line solutions.

Devices constructed in accordance wtih my invention will have improved reliability since no handling or welds are required, and all materials may be formed and applied in a vacuum.

The foregoing disclosure and the showings made in the drawings are merely illustrative of the principles of this invention and are not to be interpreted in a limiting sense.

I claim:

An electronic device including: a body of thin sheets of non-conducting material, said body being provided with a plurality of perforations; certain of said perforations forming envelopes; electron discharge devices disposed in said envelopes, said electron discharge devices having spaced planar parts disposed between certain of said sheets and extending through said envelopes; planar circuit components disposed between said sheets; and conductors disposed in some of said perforations connecting said circuit components and said planar parts in a predetermined manner to form electronic circuits, said perforations being evacuated, said thin sheets being sealed at their outer surfaces to hermetically seal and form said body.

References Cited in the file of this patent

UNITED STATES PATENTS

| | | |
|---|---|---|
| 1,718,993 | Wermine | July 2, 1929 |
| 2,501,882 | Trump et al. | Mar. 28, 1950 |
| 2,547,022 | Leno | Apr. 3, 1951 |
| 2,590,821 | Kiser | Mar. 25, 1952 |
| 2,613,252 | Heibel | Oct. 7, 1952 |
| 2,683,767 | Cunningham | July 13, 1954 |
| 2,752,537 | Wolfe | June 26, 1956 |

FOREIGN PATENTS

| | | |
|---|---|---|
| 502,101 | Great Britain | Mar. 10, 1939 |
| 953,590 | France | Dec. 8, 1949 |
| 56,090 | France | June 4, 1952 |